United States Patent
Kumamoto et al.

(10) Patent No.: US 6,263,758 B1
(45) Date of Patent: Jul. 24, 2001

(54) ACCELERATOR PEDAL MECHANISM FOR VEHICLE

(75) Inventors: Masato Kumamoto; Takumi Oikawa, both of Odawara; Yuuichirou Toukai, Minamiashigara; Yoshio Shibuya, Odawara, all of (JP)

(73) Assignee: Mikuni Corporation (JP)

( * ) Notice: Subject to any disclaimer, the term of this patent is extended or adjusted under 35 U.S.C. 154(b) by 0 days.

(21) Appl. No.: 09/381,038

(22) PCT Filed: Feb. 5, 1999

(86) PCT No.: PCT/JP99/00494

§ 371 Date: Sep. 15, 1999

§ 102(e) Date: Sep. 15, 1999

(87) PCT Pub. No.: WO99/42715

PCT Pub. Date: Aug. 26, 1999

(30) Foreign Application Priority Data

Feb. 20, 1998 (JP) .................................................. 10-038971

(51) Int. Cl.[7] ..................................................... G05G 1/14
(52) U.S. Cl. ................................ 74/513; 74/512; 74/560; 123/399
(58) Field of Search ............................ 74/512, 513, 514, 74/560; 188/83; 180/335; 123/399

(56) References Cited

U.S. PATENT DOCUMENTS

| 3,662,593 | * | 5/1972 | Pirrello et al. | 74/482 |
|---|---|---|---|---|
| 3,709,338 | * | 1/1973 | Glen | 74/512 |
| 4,944,269 | * | 7/1990 | Imoehl | 74/513 |
| 5,191,866 | * | 3/1993 | Tosdale | 74/513 |
| 5,233,882 | * | 8/1993 | Byram et al. | 74/560 |
| 5,365,802 | * | 11/1994 | Suzuki et al. | 74/482 |
| 5,385,068 | * | 1/1995 | White et al. | 74/513 |
| 5,408,899 | * | 4/1995 | Stewart | 74/513 |
| 5,416,295 | * | 5/1995 | White et al. | 74/560 |
| 5,529,296 | * | 6/1996 | Kato et al. | 74/513 |
| 5,697,260 | * | 12/1997 | Rixon et al. | 74/513 |
| 5,768,946 | * | 6/1998 | Fromer et al. | 74/560 |
| 5,934,152 | * | 8/1999 | Aschoff et al. | 74/513 |

FOREIGN PATENT DOCUMENTS

| 58-161237 | 10/1983 | (JP) . |
|---|---|---|
| 60-95361 | 6/1985 | (JP) . |
| 61-161030 | 10/1986 | (JP) . |
| 1-164520 | 11/1989 | (JP) . |
| 3168337 | 11/1989 | (JP) . |
| 6-299874 | 10/1994 | (JP) . |
| 6-83936 | 12/1994 | (JP) . |
| 9-207606 | 8/1997 | (JP) . |

* cited by examiner

Primary Examiner—Thomas R. Hannon
Assistant Examiner—Chong H. Kim
(74) Attorney, Agent, or Firm—Lorusso & Loud (57) ABSTRACT

A pedal rod (12) connected to an accelerator pedal (10) has one end which is a free end. A friction generating device (20) is disposed at the free end of the pedal rod (12). The friction generating device (20) has a cylindrical housing (26) as a fixed friction member, a movable friction member (28) disposed movably in the interior of the housing (26) and kept in contact with the housing, and a friction member return spring (30) for urging the movable friction member (28) in a predetermined direction. When the accelerator pedal (10) is depressed, the free end of the pedal rod (12) pushes both movable friction member (28) and friction member return spring (30), so that there occur friction between the movable friction member (28) and the housing (fixed friction member) and friction induced by the friction member return spling (30). Upon release of the accelerator pedal (10), the movable friction member (28) is returned to its original position by the friction member return spring (30).

9 Claims, 10 Drawing Sheets

ACCELERATOR PEDAL MECHANISM FOR VEHICLE

SPECIFICATION

BACKGROUND OF THE INVENTION

1. Field of the Invention

The present invention relates to a vehicular accelerator pedal mechanism wherein a frictional force is impairted to the accelerator pedal when the driver of the vehicle steps on the accelerator pedal, while the same force is diminished when the pedal is returned.

2. Related Art

When an automobile or the like is allowed to travel at a constant speed, the driver of the automobile is required to maintain the accelerator pedal at a certain position, which has heretofore been a cause of fatigue of the driver. Particularly in the case where an accelerator position sensor is attached directly to an accelerator pedal mechanism, an accelerator cable is omitted and therefore a frictional force exerted on the driver becomes extremely small, which especially affects the driver's fatigue. For avoiding such an inconvenience, that is, for eliminating the driver's fatigue in vehicular operation, there has been proposed a mechanism wherein a friction disc is mounted on a rotating shaft of the accelerator pedal to impart a frictional force to the accelerator pedal when the driver of the vehicle concerned steps on the pedal.

However, in the conventional mechanism wherein a frictional force is merely exerted on the accelerator pedal when depressed, the frictional force may cause an insufficient return of the accelerator pedal when the pedal is released and returned.

A mechanism for eliminating the fear of occurrence of such an insufficient return of the accelerator pedal is proposed in Japanese Patent Laid Open No. 168337/91. The mechanism disclosed therein is provided with a main shaft (a pedal rotating shaft) which rotates in accordance with depression of the accelerator pedal and which is biased by means of a return through spring so as to return a rotational angle to the original position. Further, in this mechanism, a friction generating device for generating friction which resists the rotation of the main shaft upon depression of the accelerator pedal is connected to the main shaft through an engaging/disengaging means. The engaging/disengaging means connects the main shaft and the friction generating device with each other when the accelerator pedal is depressed and it disconnects the two from each other when the pedal is released.

According to this construction, upon depression of the accelerator pedal, the friction generating device and the main shaft are brought into connection with each other through the engaging/disengaging means to impart a frictional force to the accelerator pedal. On the other hand, upon release of the accelerator pedal, the friction generating device and the main shaft are disconnected from each other by the engaging/disengaging means to diminish the friction force working on the accelerator pedal. As a result, when the accelerator pedal is returned to its original position, the friction force generated by the friction force generating device is diminished lest there should occur an insufficient return of the accelerator pedal.

In the above conventional mechanism, the main shaft adapted to rotate with depression of the accelerator pedal and the friction generating device which imparts a frictional force to the accelerator pedal are disposed coaxially with each other. Therefore, it is necessary that the friction area and the coefficient of friction between the friction generating device and the main shaft be relatively large. For this reason, it has so far been required to enhance the durability of the related components at their friction surfaces.

Moreover, when the accelerator pedal is returned, it is possible to reduce the frictional force generated by the friction generating device, but for ensuring the return of the accelerator pedal, it is necessary that the biasing force of the return spring for returning the main shaft be set large. This gives rise to a drawback such that a larger force (treading force) is required in the accelerator pedal treading direction.

The present invention has been accomplished in view of the above-mentioned problems and it is an object of the invention to provide a vehicular accelerator pedal mechanism capable of satisfying a required performance with use of a small friction force, thereby reducing the frictional force at friction surfaces in comparison with the prior art, and also capable of using a return spring with a small biasing force and, first instance, simple in structure and which is low in cost.

SUMMARY OF THE INVENTION

According to the present invention, in order to achieve the above-mentioned object, there is provided, in combination with a vehicular accelerator pedal mechanism including an accelerator pedal, a pedal rod connected to the accelerator pedal, and a pedal shaft which supports the pedal rod pivotably, a vehicular accelerator pedal mechanism further including a fixed friction member fixed to a vehicle, a movable friction member capable of moving in contact with the fixed friction member, and a friction member return spring for urging the movable friction member in a predetermined direction, and wherein the pedal rod has a free end on the side opposite to the accelerator pedal with the pedal shaft as a center, and when the pedal rod moves upon depression of the accelerator pedal, it causes the movable friction member to move against the friction member return spring while allowing the movable friction member to be in contact with the fixed friction member.

DESCRIPTION OF THE PREFERRED EMBODIMENTS

The present invention will be described below with reference to the accompanying drawings.

Figure 1:
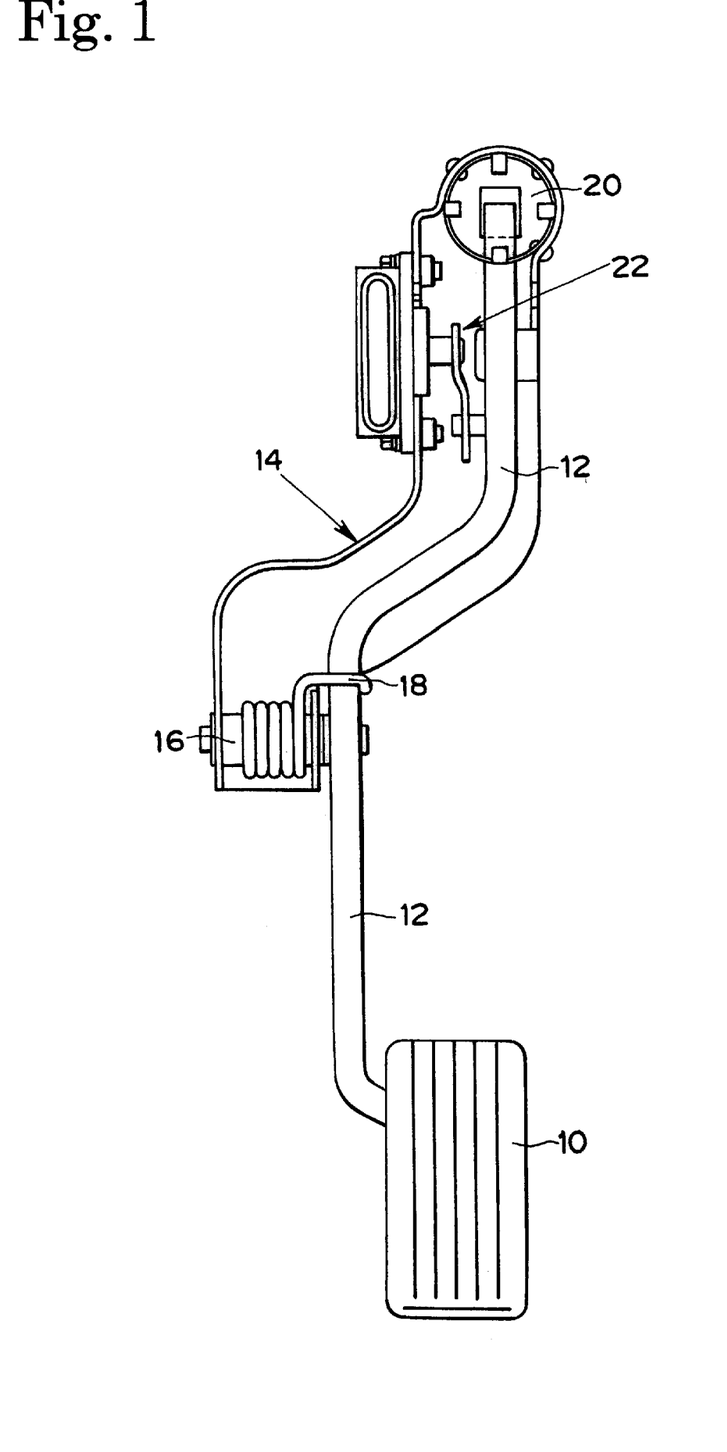
FIG. 1 is a plan view showing a vehicular accelerator pedal mechanism according to an embodiment of the present invention.
Figure 2:
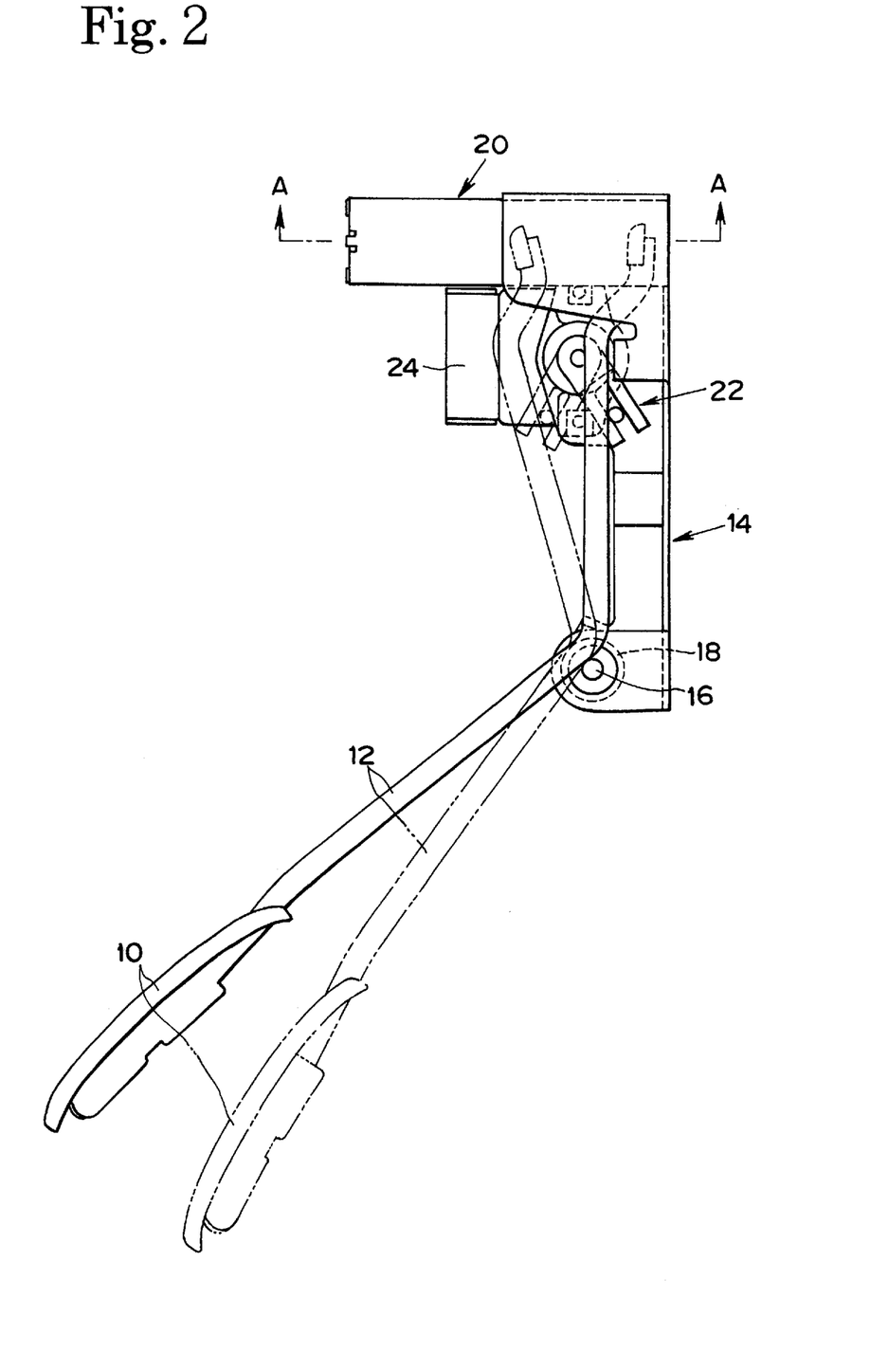
FIG. 2 is a side view thereof.
Figure 3:
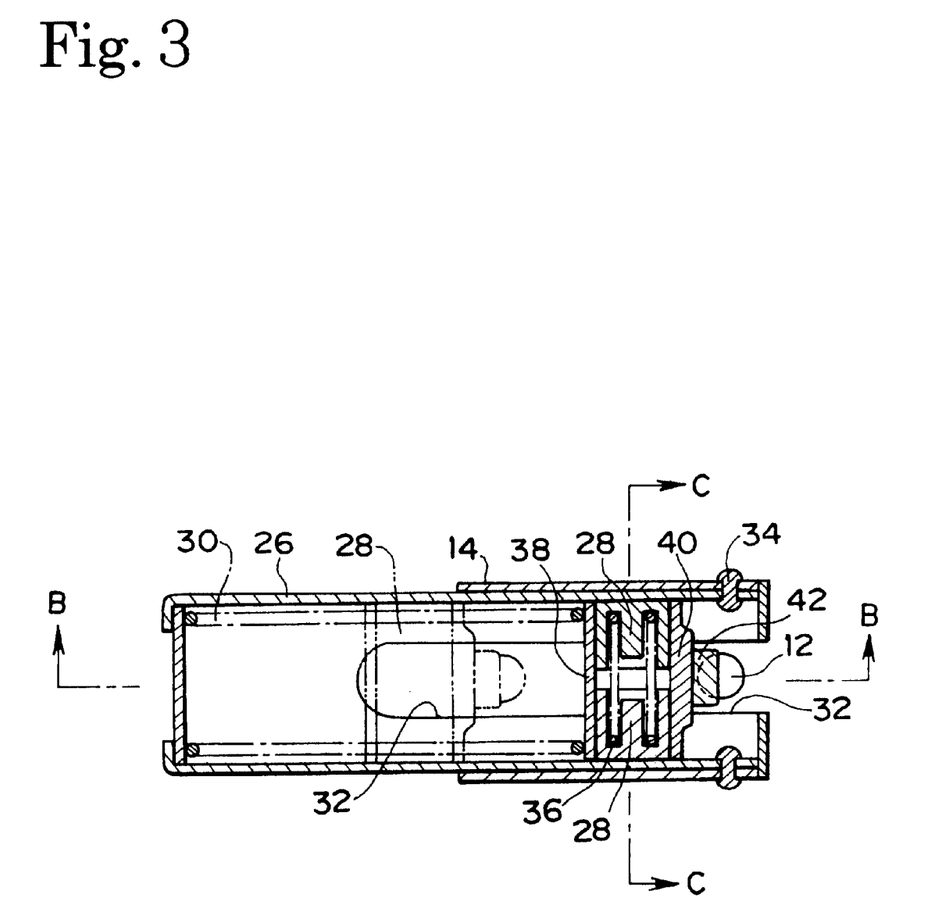
FIG. 3 is an enlarged sectional view taken on line A—A in FIG. 2.
Figure 4:
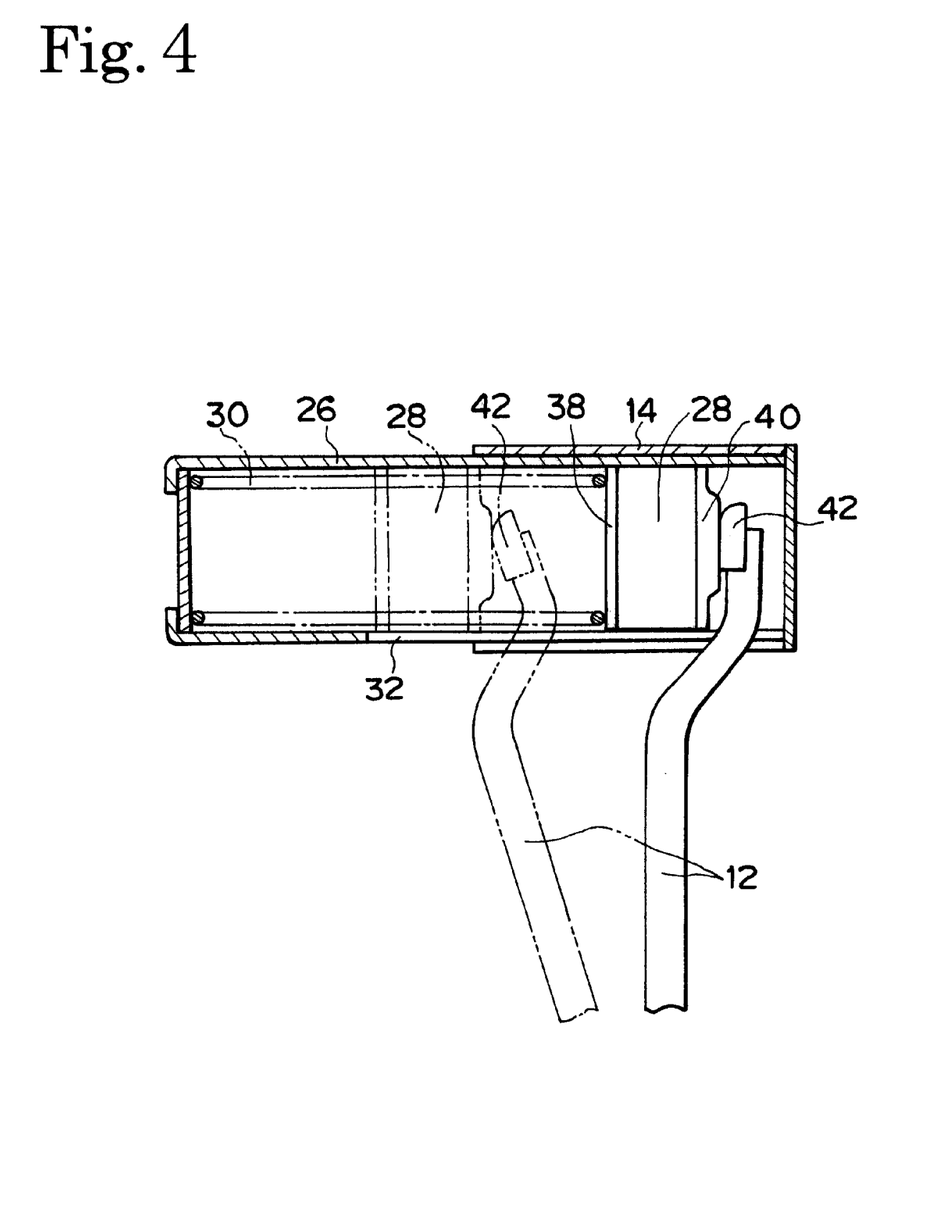
FIG. 4 is a sectional view taken on line B—B in FIG. 3.

FIG. 1 is a plan view showing a vehicular accelerator pedal mechanism according to an embodiment of the present invention, FIG. 2 is a side view thereof, FIG. 3 is an enlarged sectional view taken on line A—A in FIG. 2, and FIG. 4 is a sectional view taken on line B—B in FIG. 3.

An accelerator pedal 10 is secured to one end of a pedal rod 12, the opposite end of which is a free end. A bracket 14 is fixed to a vehicle body (not shown) and a pedal shaft 16 is supported by the bracket 14. The pedal rod 12, at an intermediate position of its length, is supported pivotally about the pedal shaft 16. Thus, the accelerator pedal 10 and the free end of the pedal rod 12 are located on opposite sides with respect to the pedal shaft 16.

A pedal return spring 18 is mounted on the pedal shaft 16 and one end thereof is hooked to the pedal rod 12. With the pedal return spring 18, the pedal rod 12 is urged in a direction in which the accelerator pedal 10 returns to its original position (the position before depression). At the free end position of the pedal rod 12 is disposed a friction generating device 20, which is fixed to the bracket 14.

Attached to the bracket 14 is an accelerator position sensor 24 having an arm 22 which is adapted to displace itself to convert a pivotal motion of the pedal rod 12 into rotation. The accelerator position sensor 24 detects the amount of depression of the accelerator pedal 10 in accordance with the displacement of the arm 22. A detailed description of the position sensor 24 having the arm 22 will here be omitted because it is of a known structure.

In FIG. 2, the solid line positions of the accelerator pedal 10 and the pedal rod 12 are with the accelerator pedal 10 not depressed, while the dotted line positions thereof are with the accelerator pedal 10 depressed.

As shown in FIGS. 3 and 4, the friction generating device 20 has a cylindrical housing 26 serving as a fixed friction member which is fixed to the bracket 14, a movable friction member 28 which is provided in the interior of the housing 26 and which is movable in contact with the housing 26, and a friction member return spring 30 for urging the movable firiction member 28 in a predetermined direction within the housing 26. It is desirable that the housing 26 be formed using a material having a high strength and having a rust preventing property, such as stainless steel. A hole or cutout 32 is formed axially in an outer wall of the housing 26. The free end of the pedal rod 12 is inserted through the cutout 32 into the housing 26. The housing 26 and the bracket 14 are fixed together with rivets 34, provided the fixing means for the housing and the bracket is not limited thereto.

Figure 5:
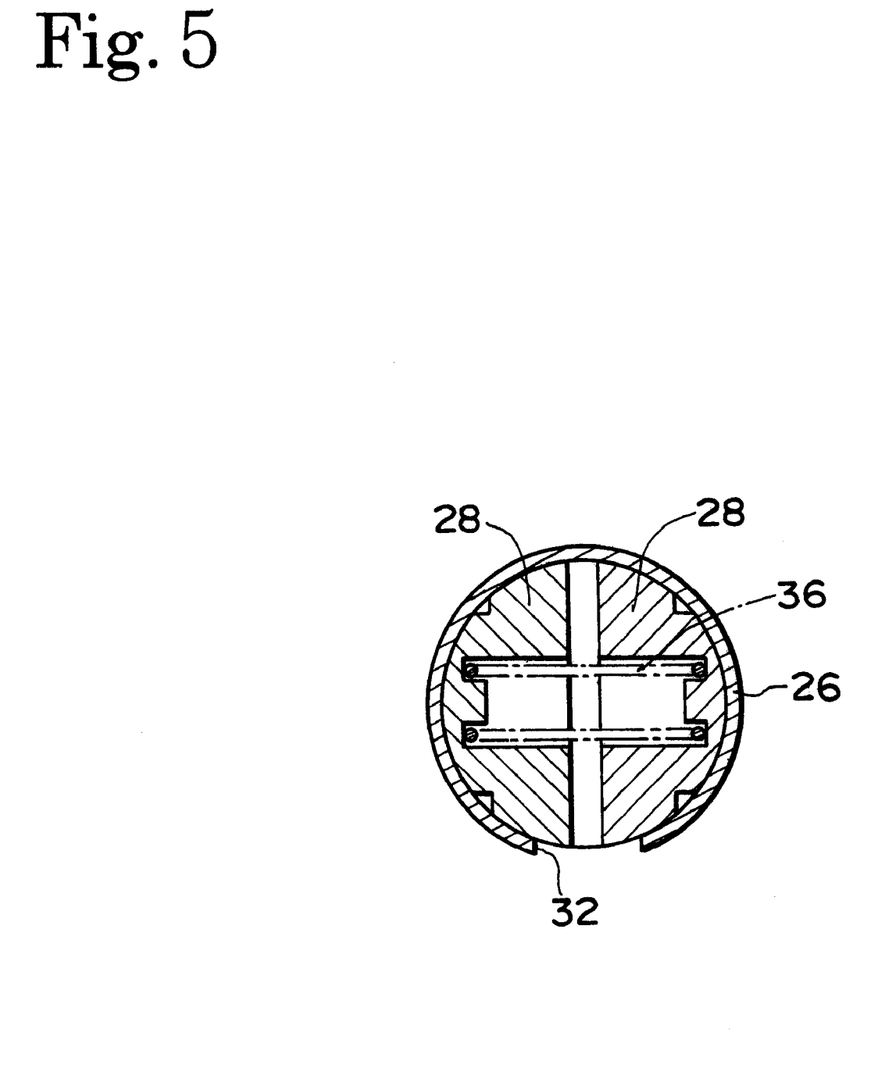
FIG. 5 is an enlarged sectional view taken on line C—C in FIG. 3.

As shown in FIGS. 3 and 5, the movable friction member 28 is in a bisplit shape obtained by cutting a generally columnar member into two along the axis thereof, and as the material thereof is used an oleoresin such as an oleopolyacetal. Between the two movable friction member halves 28 is mounted a spring 36 which urges them in radial directions away from each other. With the spring 36, the semi-columnar outer wall surface of each movable member half 28 is kept in contact with the inner wall surface of the housing 26. On both sides of the two movable friction member halves 28 are respectively disposed a first plate 38 which faces the spring 36 and a second plate 40 on the side opposite to the spring 36. It is optional whether the first and second plates 38, 40 are to be connected with each other or not.

In FIGS. 3 and 4, the solid line position of the pedal rod 12 is with the accelerator pedal 10 not depressed. That is, in both figures, the pedal rod 12 does not move any more in the right direction. In FIG. 4, upon depression of the accelerator pedal 10, the pedal rod 12 becomes movable leftwards from its solid line position.

An abutment member 42 for contact with the second plate 40 of the movable friction member 28 is fixed to the free end of the pedal rod 12 inserted into the housing 26. Since the movable friction member 28 is urged toward the pedal rod 12 by means of the friction member return spring 30, the second plate 40 located on a side face of the movable friction member 28 comes into contact with the abutment member 42.

In the present invention constructed as above, the free end of the pedal rod 12 positioned on the side opposite to the accelerator pedal 10 with respect to the pedal shaft 16 acts on the friction generating device 20 when the accelerator pedal 10 is depressed. More specifically, the pedal rod 12 moves pivotally upon depression of the accelerator pedal 10 and its free end pushes both the movable friction member 28 and the friction member return spring 30. In this case, the movable friction member 28 moves while the outer wall surface thereof is kept in contact with the inner wall surface of the housing 26 as a fixed friction member by means of the spring 36, so that the contacted portion serves as a frictional force at the time of depression of the accelerator pedal 10.

Thus, in the present invention, a frictional force is created by the movable friction member 28 upon depression of the accelerator pedal 10.

Next, upon release of the accelerator pedal 10, as shown in FIGS. 1 and 2, the pedal rod 12 moves pivotally to the opposite side under the action of the pedal return spring 18, whereby the accelerator pedal 10 is restored to its state before the depression. That is, in FIGS. 3 and 4, the pedal rod 12 (abutment member 42) is returned from its dotted line position to its solid line position.

As a result, in the friction generating device 20, the compressed state of the friction member return spring 30 by the depression of the pedal rod 12 is released, so that the movable friction member 28 is returned up to the position before depression of the accelerator pedal 10 by means of the friction member return spring 30. That is, the movable friction member 28 is returned from its dotted line position up to its solid line position in FIGS. 3 and 4. This force of the friction member return spring 30 acting to return the movable friction member 28 is added also as a force for returning the pedal rod 12 from its dotted line position up to its solid line position.

Thus, in the present invention, upon release of the accelerator pedal 10, the accelerator pedal 10 can surely be returned to its original position with two forces, the force of the pedal return spring 18 and the force of the friction member return spring 30. It is not likely at all that there will occur an insufficient return of the accelerator pedal.

Thus, in the present invention, the friction generating device 20 is actuated by the free end of the pedal rod 12 positioned on the side opposite to the accelerator pedal 10 with respect to the pedal shaft 16. Moreover, the friction generating device 20 is of a simple structure wherein the movable friction member 28 and the friction member return spring 30 are merely pushed by the free end of the pedal rod 12 when the same rod moves pivotally. Therefore, by utilizing a lever ratio centered on the pedal shaft 16, a required performance can be satisfied with a small frictional force. That a small frictional force suffices is advantageous to ensuring the durability and reliability of the friction generating device 20. Besides, the simple structure of the friction generating device 20 permits the same device to be manufactured less expensively.

Further, since the accelerator pedal 10 is returned to its original position with two forces, the force of the pedal return spring 18 and the force of the friction member return spring 30, the returning motion of the accelerator pedal 10 is not affected even if the friction generating device 20 does not function to a satisfactory extent.

Figure 6:
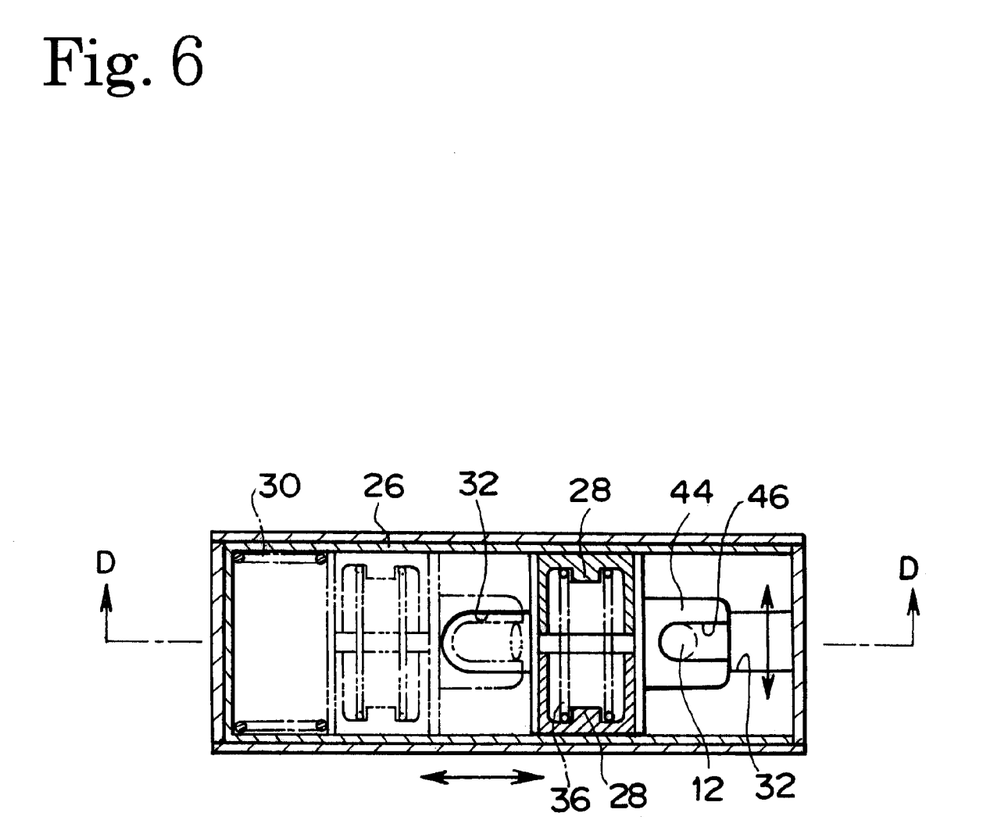
FIG. 6 is a view corresponding to FIG. 3, showing a vehicular accelerator pedal mechanism according to another embodiment of the present invention.
Figure 7:
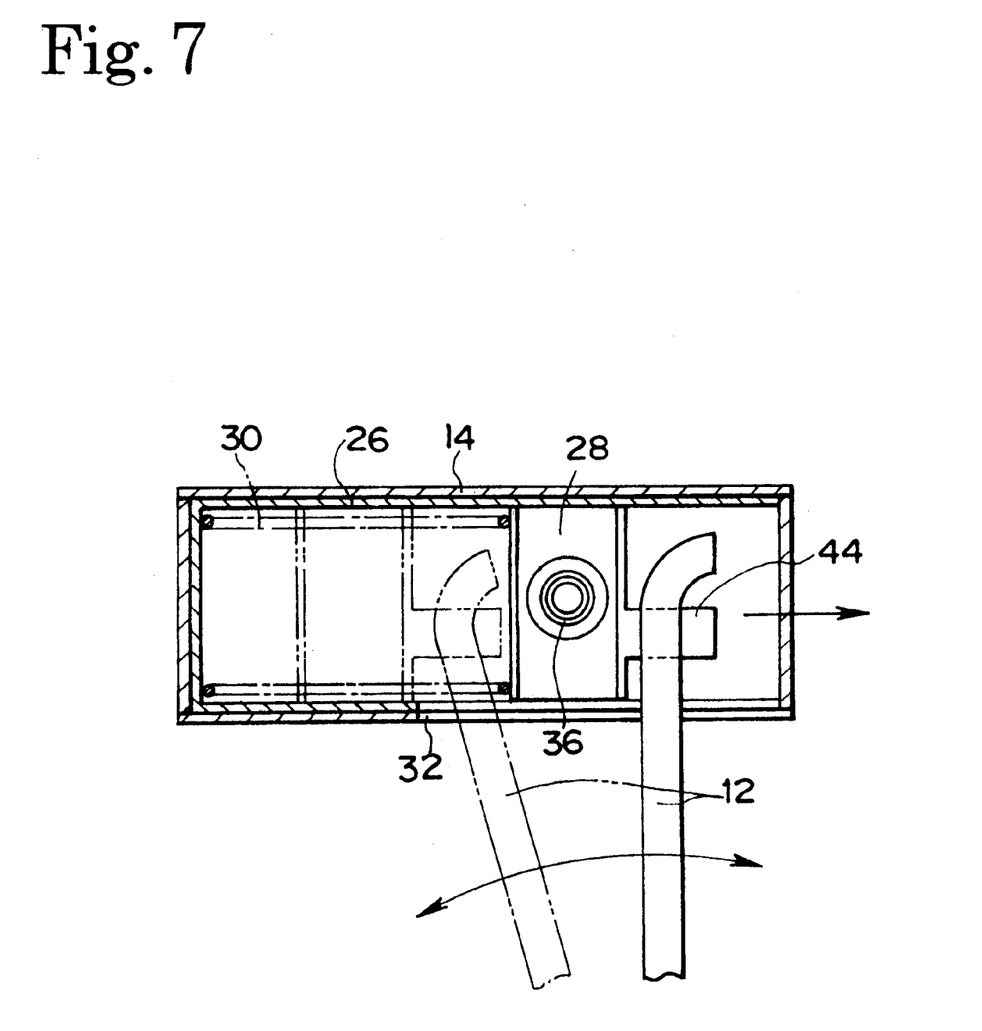
FIG. 7 is a sectional view taken on line D—D in FIG. 6.

Referring now to FIGS. 6 and 7, there is illustrated a friction generating device according to another embodiment of the present invention, in which same reference numerals as in the embodiment illustrated in FIGS. 3 and 4 represent the same portions as in the previous embodiment. A plate 44 located on a pedal rod 12 side is provided sideways of a movable friction member 28. The plate 44 has an external shape which substantially conforms to the inner wall surface of a housing 26. The plate 44 has a recess 46 of a shape which permits a free end of the pedal rod 12 to be fitted therein. This construction permits the pedal rod 12 to work on the center of the movable friction member 28 without lateral deflection.

Also in this embodiment illustrated in FIGS. 6 and 7, the movable friction member 28 and a friction member return spring 30 are pushed by the free end of the pedal rod 12, so that there can be attained the same effect as in the previous embodiment illustrated in FIGS. 3 and 4.

Figure 8:
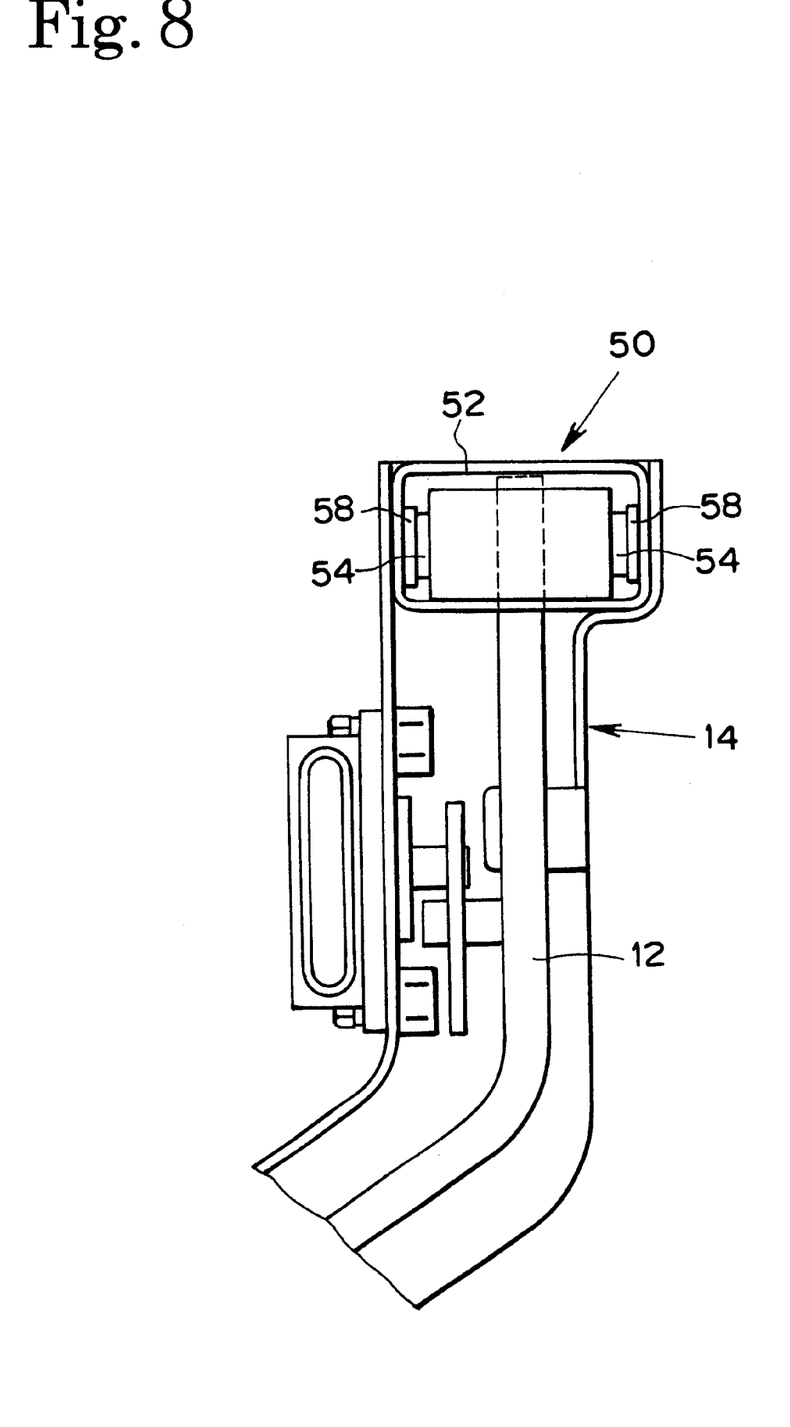
FIG. 8 is a plan view showing a vehicular accelerator pedal mechanism according to a further embodiment of the present invention.
Figure 9:
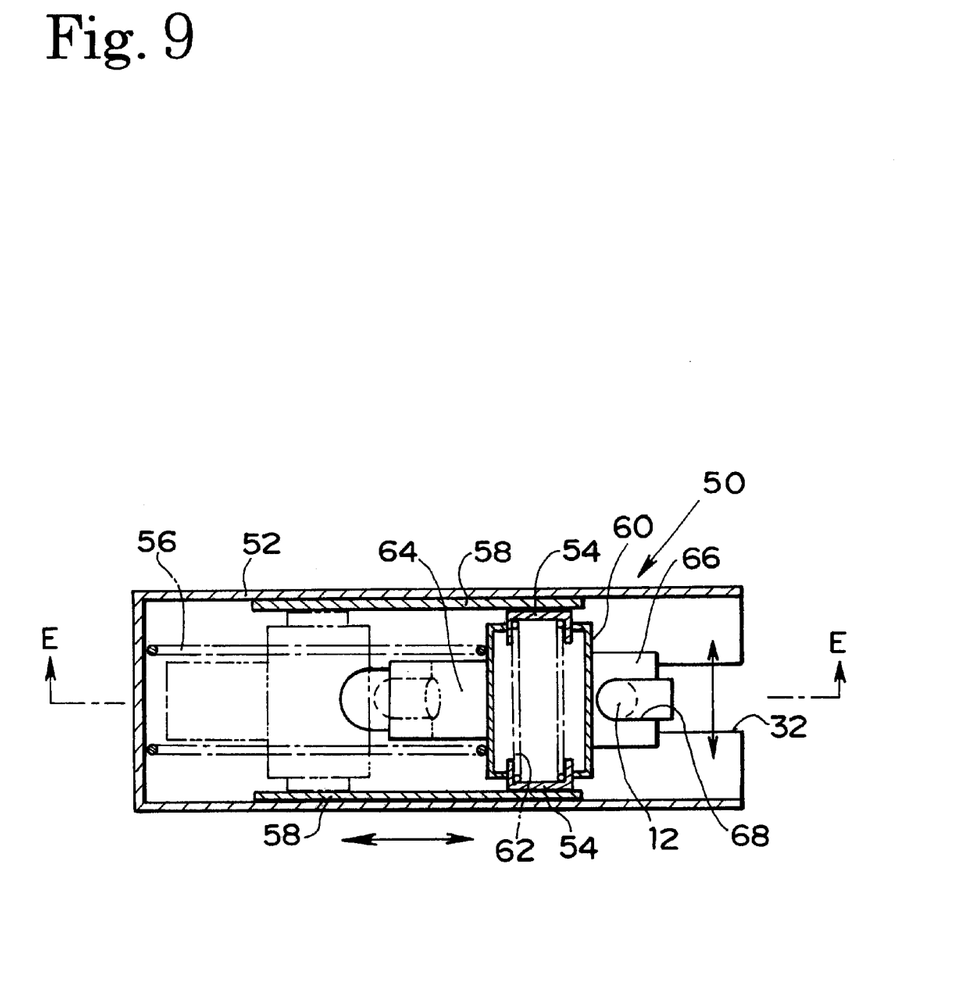
FIG. 9 is an enlarged sectional view of a friction generating device illustrated in FIG. 8.
Figure 10:
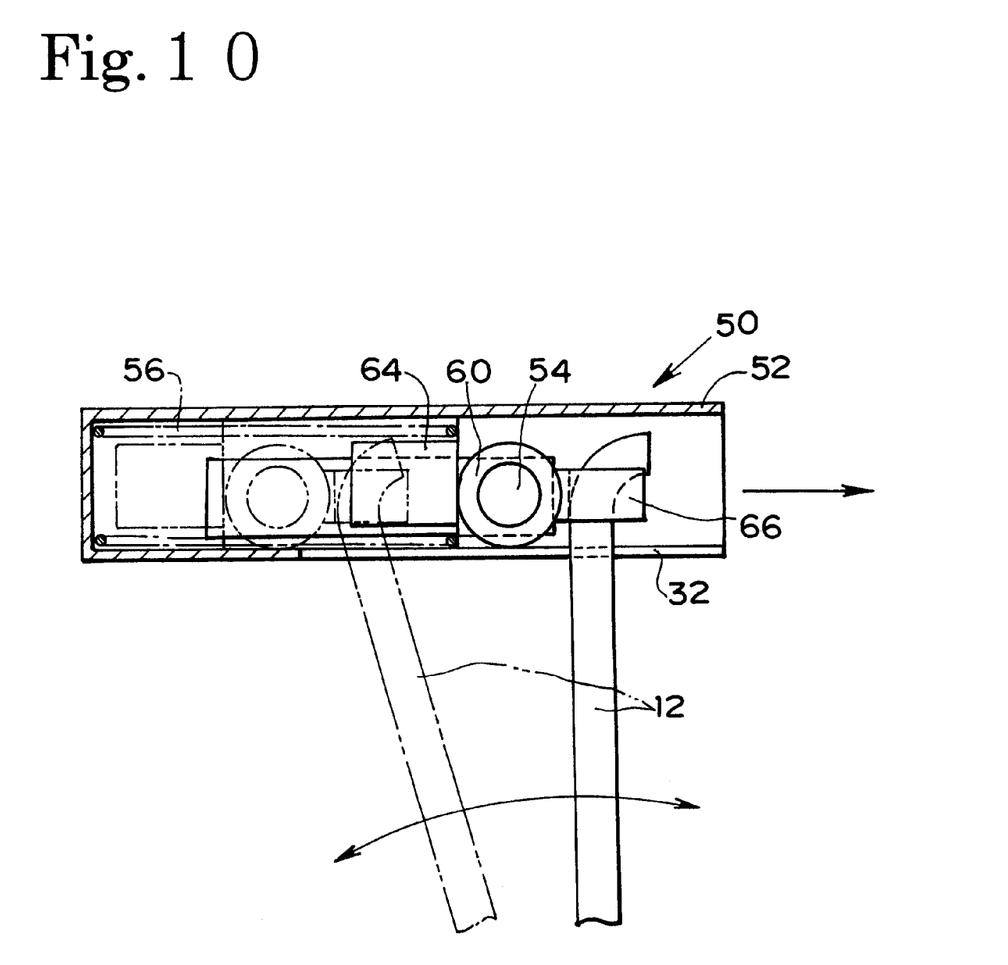
FIG. 10 is a sectional view taken on line E—E in FIG. 9.

Referring now to FIGS. 8 to 10, there is illustrated a friction generating device according to a further embodiment of the present invention. This friction generating device 50 has a housing 52, a pair of movable friction members 54 capable of moving freely within a housing 52, and a friction member return spring 56 for urging the paired movable friction members 54 in a predetermined direction. For example, the housing 52 is rectangular in section, and a total of two friction plates 58 made of stainless steel are fixed to inner surfaces opposed to each other of the housing 52. The paired movable friction members 54 are formed using an oleoresin such as an oleopolyacetal. The movable friction members 54 are held by a body 60 and are urged in directions away from each other by means of a spring 62 so as to be kept in contact with the fixed friction plates 58 fixed to the housing 52 no matter to which position the movable friction members 54 may move.

Sideways of the body 60 which holds the movable friction member 54, there are provided a spring guide 64 formed on the friction member return spring 56 side and a plate 66 formed on the side opposite to the spring guide 64. In the plate 66 is formed a recess 68 of a shape which permits a free end of a pedal rod 12 to be fitted therein.

Also according to the construction of this embodiment, the movable friction member 54 and the friction member return spring 56 are pushed by the free end of the pedal rod 12, there can be attained the same effect as in the embodiment illustrated in FIGS. 3 and 4.

Industrial Applicability

As set forth above, the vehicular accelerator pedal mechanism according to the present invention is of a simple structure such that the movable friction member and the friction member return spring are pushed by the free end of the pedal rod located on the side opposite to the accelerator pedal with the pedal shaft as a center. Therefore, a small frictional force suffices to meet a required performance in comparison with the conventional structure wherein a shaft is rotated by an accelerator pedal. That a small frictional force suffices is advantageous to ensuing high durability and reliability of the friction generating device. Besides, the friction generating device can be manufactured less expensively because of a simple structure thereof.

Further, by replacing the movable friction member and the friction member return spring, it is possible to satisfy various requests. Additionally, even in the event the movable friction member and the friction member return spring should become defective in their return function, no influence is exerted on the returning motion of the accelerator pedal performed by the pedal return spring.

What is claimed is:

1. A vehicular accelerator pedal mechanism comprising:
an accelerator pedal,
a pedal rod having one end connected to said accelerator pedal,
a pedal shaft which supports said pedal rod pivotably for movement of said accelerator pedal away from and toward a rest position,
a fixed friction member fixed to a vehicle,
a movable friction member which moves relative to and in contact with said fixed friction member, and
a friction member return spring urging said movable friction member in a predetermined direction, and
wherein said pedal rod has a free end opposite said one end, said free end, responsive to depression of the accelerator pedal away from said rest position, pushing against said movable friction member to cause said movable friction member to move relative to and in contact with said fixed friction member, in a direction opposite said predetermined direction and against said friction member return spring.

2. A vehicular accelerator pedal mechanism according to claim 1, wherein said movable friction member comprises two members, and a spring is disposed between said two members to urge the two members in directions away from each other.

3. A vehicular accelerator pedal mechanism according to claim 2, wherein said fixed friction member is formed by a cylindrical housing, and a cutout for insertion therein of said pedal rod is formed axially in said cylindrical housing.

4. A vehicular accelerator pedal mechanism according to claim 2, wherein said fixed friction member is fixed to an inner surface of a cylindrical housing, and a cutout for insertion therein of said pedal rod is formed axially in said cylindrical housing.

5. A vehicular accelerator pedal mechanism according to claim 1, wherein a plate having a recess for fitting therein of said pedal rod is provided sideways of said movable friction member.

6. A vehicular accelerator pedal mechanism according to claim 1 further comprising an accelerator pedal return spring for biasing said pedal rod to pivot said accelerator pedal toward said rest position, said accelerator pedal return spring and said friction member return spring acting in concert to return said accelerator pedal to said rest position responsive to release of said accelerator pedal.

7. A vehicular accelerator pedal mechanism according to claim 1, wherein said pedal shaft supports said pedal rod centrally with said one end and said free end on opposite sides of said pedal shaft.

8. A vehicular accelerator pedal mechanism according to claim 1, wherein said fixed and movable friction members are cylindrical members and wherein said contact is frictional, sliding contact between an outer cylindrical surface of one of said friction members and an inner cylindrical surface of the other of said friction members.

9. A vehicular accelerator pedal mechanism according to claim 8 wherein said one friction member is longitudinally divided into sections and further comprising at least one spring disposed between said sections and urging said sections away from each other.

* * * * *